United States Patent
Ozeki

(10) Patent No.: US 11,531,320 B2
(45) Date of Patent: Dec. 20, 2022

(54) NUMERICAL CONTROLLER INCLUDING REDUCED MEMORY SERVICE LIFE CALCULATION UNIT, NUMERICAL CONTROL SYSTEM, AND NON-TRANSITORY COMPUTER READABLE RECORDING MEDIUM

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 187 days.

(21) Appl. No.: 16/849,188

(22) Filed: Apr. 15, 2020

(65) Prior Publication Data

US 2020/0363785 A1 Nov. 19, 2020

(30) Foreign Application Priority Data

May 15, 2019 (JP) .............................. JP2019-092277

(51) Int. Cl.
G05B 19/4065 (2006.01)

(52) U.S. Cl.
CPC ............. *G05B 19/4065* (2013.01); *G05B 2219/37252* (2013.01)

(58) Field of Classification Search
CPC ...... G05B 19/4065; G05B 2219/37252; G05B 2219/37616
See application file for complete search history.

(56) References Cited

U.S. PATENT DOCUMENTS

| | | | |
|---|---|---|---|
| 2003/0002366 A1* | 1/2003 | Mizoguchi | G11C 29/76 365/201 |
| 2017/0131947 A1* | 5/2017 | Hoang | G06F 11/00 |
| 2017/0277631 A1* | 9/2017 | Tsuruya | G11C 15/04 |
| 2017/0300242 A1* | 10/2017 | Matsushita | G06F 3/0688 |
| 2018/0253084 A1* | 9/2018 | Diaz | G05B 19/414 |

FOREIGN PATENT DOCUMENTS

| | | |
|---|---|---|
| JP | 2003-085054 | 3/2003 |
| JP | 2015-198377 A | 11/2015 |
| JP | 6411003 B1 | 10/2018 |

OTHER PUBLICATIONS

Notification of Reasons for Refusal dated Sep. 20, 2022 in JP Patent Application No. 2019-092277.

* cited by examiner

*Primary Examiner* — Kenneth M Lo
*Assistant Examiner* — Tameem D Siddiquee
(74) *Attorney, Agent, or Firm* — Wenderoth, Lind & Ponack, L.L.P.

(57) ABSTRACT

A numerical controller that collects data from an industrial machine and writes data into a storage medium includes: an interval setting unit that sets a time interval between cycles in which one cycle involves collection of operation information indicating an operating state of the industrial machine and writing of the collected operation information to the storage medium; a reduced service life calculation unit that calculates a service life of the number of writes of the storage medium reduced by the writing on the basis of the set time interval as a reduced service life; a determining unit that determines whether the calculated reduced service life exceeds a prescribed threshold; and a signal output unit that outputs a signal indicating that the reduced service life exceeds the prescribed threshold when it is determined that the reduced service life exceeds the prescribed threshold.

5 Claims, 4 Drawing Sheets

NUMERICAL CONTROLLER INCLUDING REDUCED MEMORY SERVICE LIFE CALCULATION UNIT, NUMERICAL CONTROL SYSTEM, AND NON-TRANSITORY COMPUTER READABLE RECORDING MEDIUM

This application is based on and claims the benefit of priority from Japanese Patent Application No. 2019-092277, filed on 15 May 2019, the content of which is incorporated herein by reference.

BACKGROUND OF THE INVENTION

Field of the Invention

The present invention relates to a numerical controller, a numerical control system, and a non-transitory computer readable recording medium having a program recorded thereon.

Related Art

Conventionally, an industrial machine including an industrial robot or a machine tool, in which a numerical controller (CNC, computerized numerical control) for performing machining processes is incorporated is known. In an industrial machine, the operation of the industrial machine is controlled using the numerical controller. Therefore, the numerical controller collects and stores various pieces of data of a control target industrial machine periodically from the industrial machine in order to grasp the operating state of the industrial machine. The numerical controller collects and stores (records) various pieces of data such as axis-related data, state data, operation data, and maintenance data periodically using a data logger, for example. Moreover, the numerical controller acquires various pieces of data from the industrial machine at each of the time intervals set in the data logger, for example. The numerical controller stores various pieces of data in a solid state drive (SSD), which is a storage medium, for example.

The service life (total service life) set in an SSD is sometimes represented as a total number of possible writes. Such an expression results from the fact that an SSD deteriorates with writing. When an SSD approaches its service life, many error sectors resulting in write failure occur. Therefore, it is preferable that an SSD in which many error sectors occur is replaced in an early stage. Therefore, a service life monitoring device capable of warning the approach of the service life of an SSD, for example, has been proposed (for an example, see Patent Document 1).

Patent Document 1: Japanese Unexamined Patent Application, Publication No. 2003-85054

SUMMARY OF THE INVENTION

The service life monitoring device of Patent Document 1 monitors the state of each sector of an SSD. Specifically, the service life monitoring device detects a write error in each sector and outputs a warning. However, the service life monitoring device of Patent Document 1 can only detect the service life of an SSD at the occurrence time of an error, and cannot predict a future service life.

However, when the period set in a data logger becomes shorter, since the load on a storage medium (SSD) increases further, the time to future replacement of a storage medium may become shorter. Moreover, even though the service life of a storage medium has been reduced greatly, an operator may not notice such a reduction. Therefore, it may be preferable to be able to output a signal indicating that it is expected that the service life of a storage medium will decrease due to the settings.

(1) An aspect of the present disclosure provides a numerical controller that collects data from an industrial machine and writes data into a storage medium, including: an interval setting unit that sets a time interval between cycles in which one cycle involves collection of operation information indicating an operating state of the industrial machine and writing of the collected operation information to the storage medium; a reduced service life calculation unit that calculates a service life of the number of writes of the storage medium reduced by the writing on the basis of the set time interval as a reduced service life; a determining unit that determines whether the calculated reduced service life exceeds a prescribed threshold; and a signal output unit that outputs a signal indicating that the reduced service life exceeds the prescribed threshold when it is determined that the reduced service life exceeds the prescribed threshold.

(2) Another aspect of the present disclosure provides a numerical control system including: the numerical controller according to (1); and a server having the storage medium and being connected to the numerical controller.

(3) Another aspect of the present disclosure provides a non-transitory computer readable recording medium having a program recorded thereon, the program causing a computer to function as a numerical controller that collects data from an industrial machine and writes data into a storage medium, the computer functioning as: an interval setting unit that sets a time interval between cycles in which one cycle involves collection of operation information indicating an operating state of the industrial machine and writing of the collected operation information to the storage medium; a reduced service life calculation unit that calculates a service life of the number of writes of the storage medium reduced by the writing on the basis of the set time interval as a reduced service life; a determining unit that determines whether the calculated reduced service life exceeds a prescribed threshold; and a signal output unit that outputs a signal indicating that the reduced service life exceeds the prescribed threshold when it is determined that the reduced service life exceeds the prescribed threshold.

According to an aspect, a numerical controller, a numerical control system, and a non-transitory computer readable recording medium having a program recorded thereon, capable of outputting a signal indicating that it is expected that the service life of a storage medium will decrease due to the settings can be provided.

DETAILED DESCRIPTION OF THE INVENTION

Hereinafter, a numerical controller 1, a numerical control system 100, and a program according to respective embodiments of the present disclosure will be described with reference to FIGS. 1 to 4. First, an outline in which the numerical controller 1 collects and stores data of an industrial machine will be described. In the following description, an industrial machine is sometimes referred to as a machine tool 200.

The numerical controller 1 is a device connected to or integrated with the machine tool 200. The numerical controller 1 collects and stores various pieces of data from the machine tool 200 at regular intervals in order to control the machine tool 200. The numerical controller 1 collects and stores axis-related data, state data, operation data, and maintenance data of the machine tool 200 as various pieces of data (operation information) at preset prescribed regular intervals using data logger software, for example, A data logger is configured such that a time interval for collecting operation information can be set therein. When the set time interval is 0.1 sec, for example, operation information is stored in the storage medium every 0.1 sec. It is generally known that a sector error occurs in SSDs when performing writing tens of thousands to hundreds of thousands per block. Therefore, when operation information is collected and stored at time intervals of 0.1 sec, the service life of the storage medium is calculated to be several months. Therefore, the numerical controller 1 of the respective embodiments below monitors the set time interval in order to prevent unintended reduction in the service life of a storage medium.

First Embodiment

Figure 1:
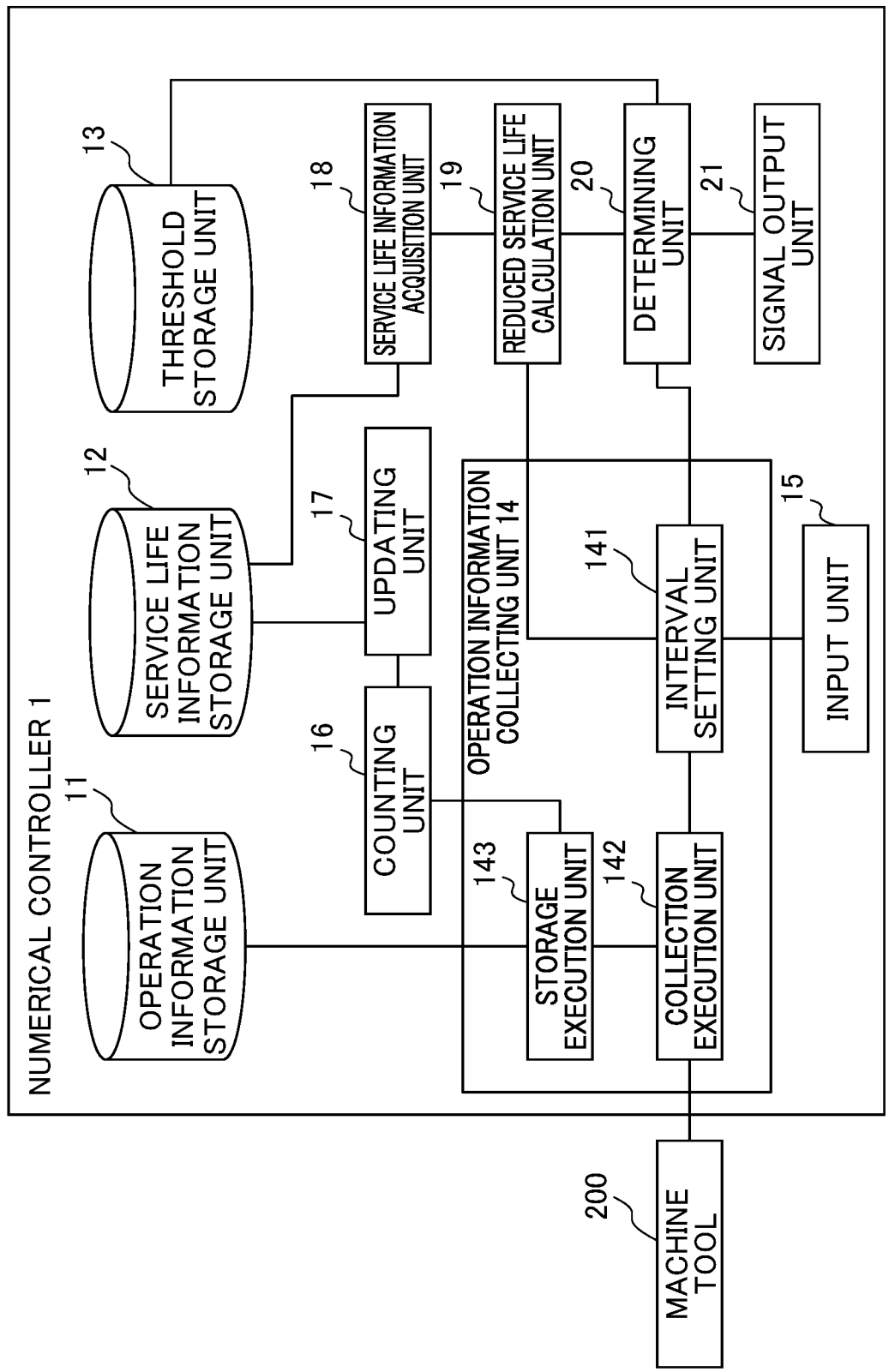
FIG. 1 is a block diagram illustrating a numerical controller according to a first embodiment.
Figure 2:
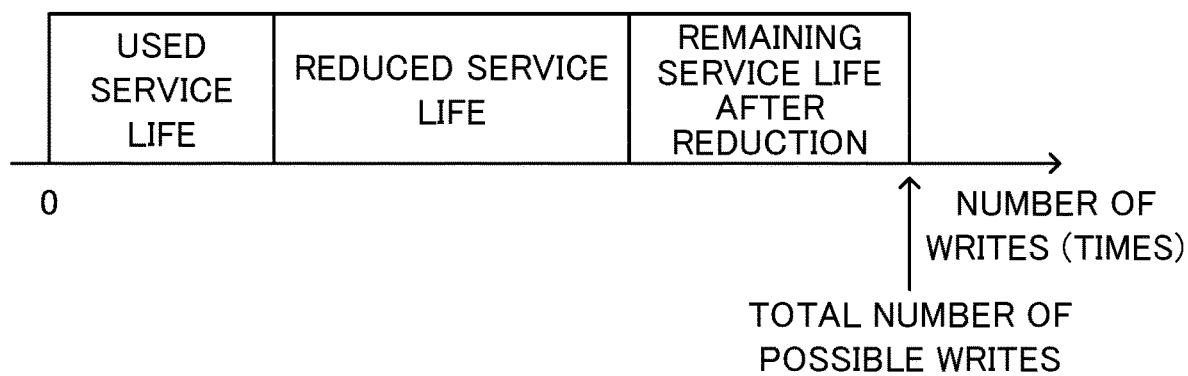
FIG. 2 is a graph illustrating the content output by a signal output unit of the numerical controller according to the first embodiment.
Figure 3:
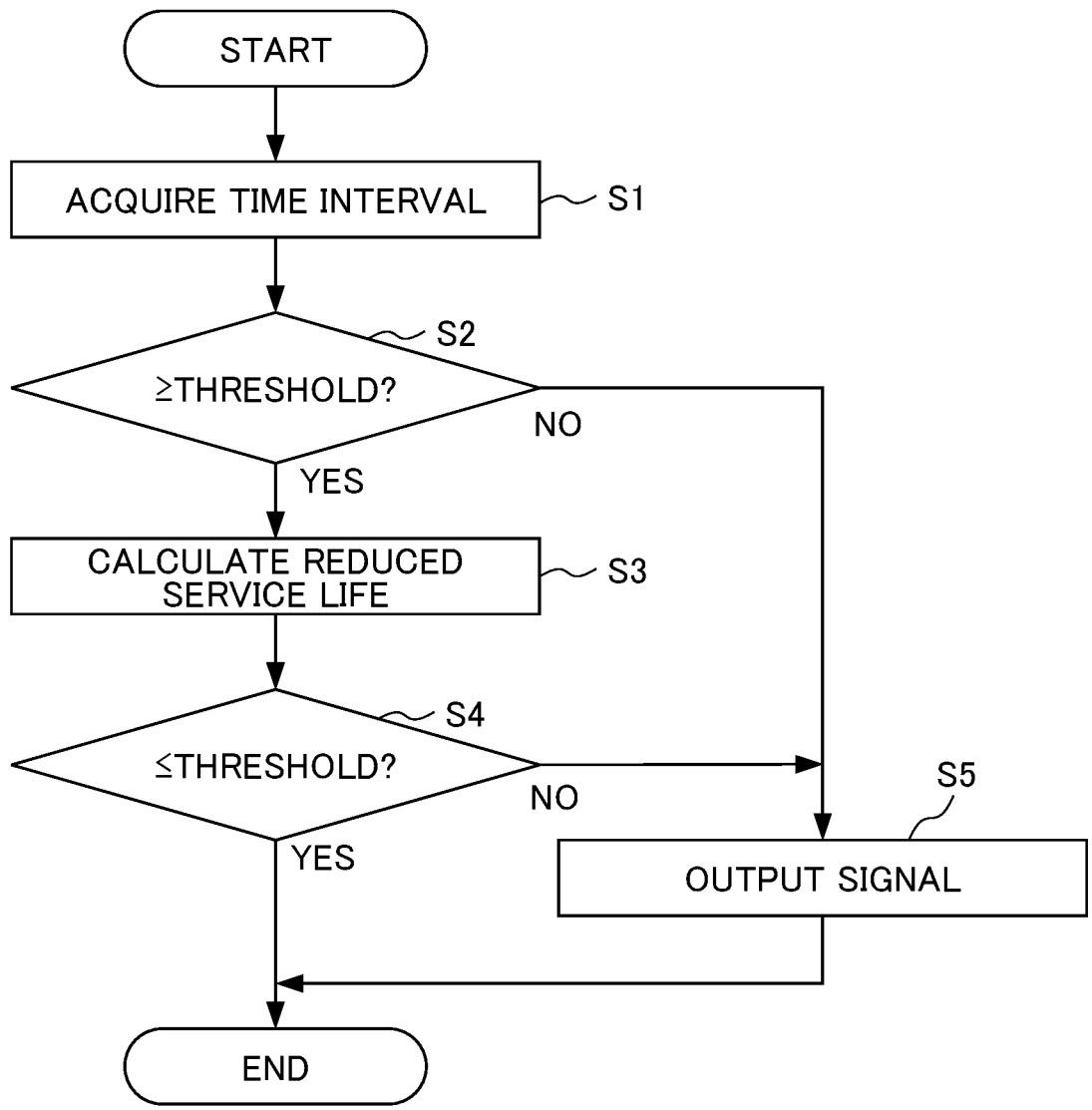
FIG. 3 is a flowchart illustrating the flow of an operation of the numerical controller according to the first embodiment.

Next, a numerical controller 1 and a program according to a first embodiment of the present disclosure will be described with reference to FIGS. 1 to 3. The numerical controller 1 according to the present embodiment is a device that collects data from an industrial machine (the machine tool 200) and writes data into a storage medium. As shown in FIG. 1, the numerical controller 1 includes an operation information storage unit 11, a service life information storage unit 12, a threshold storage unit 13, an operation information collecting unit 14, an input unit 15, a counting unit 16, a updating unit 17, a service life information acquisition unit 18, a reduced service life calculation unit 19, a determining unit 20, and a signal output unit 21.

The operation information storage unit 11 is a secondary storage medium, for example. Specifically, the operation information storage unit 11 is an SSD. The operation information storage unit 11 stores the operation information collected from the machine tool 200.

The service life information storage unit 12 is a secondary storage medium, for example. The service life information storage unit 12 stores service life information related to the service life of the operation information storage unit 11. The service life information storage unit 12 stores service life information indicating the remaining number of possible writes to the operation information storage unit 11 as a remaining service life, for example. Moreover, the operation information storage unit 11 stores service life information that further includes the number of completed writes to the operation information storage unit as a used service life, for example. The service life information storage unit 12 stores service life information that includes the total number of possible writes of the operation information storage unit 11 as a total service life, for example.

The threshold storage unit 13 is a secondary storage medium, for example. The threshold storage unit 13 stores a threshold related to reduction in the service life of the operation information storage unit 11 due to storage of the operation information. The threshold storage unit 13 stores a threshold related to the length of a time interval to be set, for example. Moreover, the threshold storage unit 13 stores a threshold related to a reduction in the service life due to storage of the operation information in the operation information storage unit 11, for example.

The operation information collecting unit 14 is realized when a CPU operates, for example. The operation information collecting unit 14 is configured as a data logger, for example. The operation information collecting unit 14 includes an interval setting unit 141, a collection execution unit 142, and a storage execution unit 143.

The interval setting unit 141 sets a time interval between cycles in which one cycle involves collection of operation information indicating an operating state of an industrial machine (the machine tool 200) and writing of the collected operation information to a storage medium. Moreover, the interval setting unit 141 sets a collection period in which collection of the operation information of the industrial machine (the machine tool 200) is executed.

The collection execution unit 142 collects operation information from the machine tool 200 according to the time interval and the collection period set by the interval setting unit 141.

The storage execution unit 143 stores the operation information collected by the collection execution unit 142 in the operation information storage unit 11. The storage execution unit 143 stores the operation information in the operation information storage unit 11 according to the interval set by the interval setting unit 141, for example.

The input unit 15 is an input interface such as a keyboard or a mouse, for example. The input unit 15 receives input of a time interval between cycles from an operator. Moreover, the input unit 15 receives input of a collection period. The input unit 15 transmits the received time interval and collection period to the interval setting unit 141.

The counting unit 16 is realized when a CPU operates, for example. The counting unit 16 counts the number of storages of the operation information in the operation information storage unit 11, executed by the storage execution unit 143.

The updating unit 17 is realized when a CPU operates, for example. The updating unit 17 stores the number of storages counted by the counting unit 16 in the service life information storage unit 12. Specifically, the updating unit 17 updates the service life information stored in the service life information storage unit 12. For example, the updating unit 17 updates the remaining service life and the used service life included in the service life information.

The service life information acquisition unit 18 is realized when a CPU operates, for example. The service life information acquisition unit 18 acquires the service life information from the service life information storage unit 12. Specifically, the service life information acquisition unit 18 acquires service life information indicating the remaining number of possible writes to the operation information storage unit 11 as a remaining service life. Moreover, the service life information acquisition unit 18 acquires the service life information that further includes the number of completed writes to the operation information storage unit 11 as a used service life. Moreover, the service life information acquisition unit 18 acquires the service life information that includes the upper-limit number of writes to the operation information storage unit 11 as a total service life.

The reduced service life calculation unit 19 is realized when a CPU operates, for example. The reduced service life calculation unit 19 calculates the service life of the number of writes of the operation information storage unit 11 reduced due to writing on the basis of the set time interval as the reduced service life. For example, the reduced service life calculation unit 19 calculates the reduced service life of the operation information storage unit 11, reduced when the operation information is collected and stored in the set collection period at the set time interval.

The determining unit 20 is realized when a CPU operates, for example. The determining unit 20 determines whether the calculated reduced service life exceeds a prescribed threshold. For example, the determining unit 20 determines whether the reduced service life exceeds a threshold (a threshold related to reduction) of the reduced service life stored in the threshold storage unit 13. Specifically, the determining unit 20 determines whether a percentage of the reduced service life in relation to a difference between the acquired remaining service life and the reduced service life exceeds a prescribed threshold. Specifically, the determining unit 20 determines whether the following expression is satisfied.

(Threshold %)<((Reduced service life)/[(Remaining service life)−(Reduced service life)]=(Remaining service life after reduction))×100

Moreover, the determining unit 20 determines whether the set time interval is shorter than a prescribed threshold.

The signal output unit 21 is realized when a CPU operates, for example. Moreover, the signal output unit 21 includes a display device (not shown) such as a display, for example. The signal output unit 21 outputs a signal indicating that the reduced service life exceeds a prescribed threshold when it is determined that the reduced service life exceeds the prescribed threshold. Moreover, the signal output unit 21 outputs a signal indicating that the set time interval is shorter than a prescribed threshold when it is determined that the time interval is shorter than the prescribed threshold. For example, as shown in FIG. 2, the signal output unit 21 displays the used service life, the reduced service life, and the remaining service life after reduction with respect to the upper-limit number of writes in a graph.

Next, the operation of the numerical controller 1 will be described.

(Collection and Storage of Operation Information)

First, the flow of collecting and storing operation information will be described.

First, the input unit 15 receives input of the collection period and the time interval between cycles. The input unit 15 transmits the received time interval and collection period to the interval setting unit 141.

Subsequently, the interval setting unit 141 sets the received time interval and collection period in the collection execution unit 142. The collection execution unit 142 collects the operation information of the machine tool 200 in the set collection period at the set time interval. The storage execution unit 143 stores the operation information collected by the collection execution unit 142 in the operation information storage unit 11.

Subsequently, the counting unit 16 counts the number of writes of the operation information to the operation information storage unit 11 by the storage execution unit 143. The updating unit 17 updates the service life information stored in the service life information storage unit 12 using the counting result obtained by the counting unit 16.

(Determination of Expected Reduced Service Life)

Subsequently, an operation of determining an expected reduced service life due to collection and storage of the operation information will be described with reference to FIG. 3. First, the determining unit 20 acquires the time interval set by the interval setting unit 141 (step S1). Moreover, the determining unit 20 acquires a threshold related to the time interval stored in the threshold storage unit 13.

Subsequently, the determining unit 20 determines whether the time interval is equal to or larger than the threshold (step S2). When the time interval is equal to or larger than the threshold (step S2: YES), the process of this flow proceeds to step S3. On the other hand, when the time interval is shorter than the threshold (step S2: NO), the process of this flow proceeds to step S5.

In step S3, the reduced service life calculation unit 19 calculates a reduced service life. Specifically, the reduced service life calculation unit 19 receives the service life information acquired by the service life information acquisition unit 18. Moreover, the reduced service life calculation unit 19 acquires the collection period and the time interval set by the interval setting unit 141. The reduced service life calculation unit 19 transmits the reduced service life calculated using the service life information, the time interval, and the collection period to the determining unit 20.

Subsequently, the determining unit 20 determines whether the reduced service life is equal to or less than a prescribed threshold (step S4). For example, the determining unit 20 determines whether a percentage of the reduced service life calculated by the reduced service life and the service life information is equal to or larger than a prescribed threshold. When the reduced service life is equal to or less than the prescribed threshold (step S4: YES), the process of this flow ends. On the other hand, when the reduced service life exceeds the prescribed threshold (step S4: NO), the process of this flow proceeds to step S5.

In step S5, the signal output unit 21 outputs a signal indicating that the reduced service life exceeds the prescribed threshold. For example, a graph shown in FIG. 2 is displayed on a display device on the basis of the signal indicating that the reduced service life exceeds the prescribed threshold. Moreover, the signal output unit 21 outputs a signal indicating that the settings of the time interval or the collection period are to be changed.

Next, a program for causing a computer to function as the numerical controller 1 will be described. Each of the components included in the numerical controller 1 can be realized by hardware, software, or a combination thereof. Here, being realized by software means being realized when a computer reads and executes a program.

The programs can be stored on any of various types of non-transitory computer readable media and be provided to a computer. The non-transitory computer readable media include various types of tangible storage media. Examples of the non-transitory computer readable media include a magnetic recording medium (for example a flexible disk, a magnetic tape, and a hard disk drive), a magneto-optical recording medium (for example a magneto-optical disk), a CD-ROM (Read Only Memory), a CD-R, a CD-R/W, a semiconductor memory (for example a mask ROM, a PROM (Programmable ROM), an EPROM (Erasable PROM), a flash ROM, and a RAM (Random Access Memory)). The programs may be provided to a computer by using any of the various types of transitory computer readable media. Examples of the transitory computer readable media include electric signals, optical signals and electromagnetic waves. A transitory computer readable medium can provide programs to a computer through a wired communication path such as an electrical cable, optical fiber, or the like, or a wireless communication path.

According to the numerical controller 1 and the program according to the present embodiment, the following effects are obtained.

(1) A numerical controller 1 that collects data from an industrial machine and writes data into a storage medium includes: an interval setting unit 141 that sets a time interval between cycles in which one cycle involves collection of operation information indicating an operating state of the industrial machine and writing of the collected operation information into the storage medium; a reduced service life calculation unit 19 that calculates a service life of the number of writes of the storage medium reduced by the writing on the basis of the set time interval as a reduced service life; a determining unit 20 that determines whether the calculated reduced service life exceeds a prescribed threshold; and a signal output unit 21 that outputs a signal indicating that the reduced service life exceeds the prescribed threshold when it is determined that the reduced service life exceeds the prescribed threshold. In this way, when it is expected that the reduced service life of a storage medium reaches a prescribed value or more, a signal can be output to an operator in advance. Therefore, it is possible to prevent unintended reduction in the service life of a storage medium. Therefore, it is possible to extend the service life of a storage medium.

(2) The determining unit 20 determines whether the set time interval is shorter than a prescribed threshold, and when it is determined that the time interval is shorter than the prescribed threshold, the signal output unit 21 outputs a signal indicating that the set time interval is shorter than the prescribed threshold. In this way, it is possible to prevent execution of such settings that the service life of a storage medium decreases regardless of a collection period.

(3) The numerical controller 1 further includes a service life information acquisition unit 18 that acquires service life information indicating a remaining number of possible writes to the storage medium as a remaining service life, and the determining unit 20 determines whether a percentage of the reduced service life in relation to the acquired remaining service life exceeds a prescribed threshold. In this way, it is possible to prevent occurrence of a reduced service life which reaches a prescribed percentage with respect to a remaining service life.

(4) The numerical controller 1 further includes a service life information acquisition unit 18 that acquires service life information indicating a remaining number of writable times to the storage medium as a remaining service life, and the determining unit 20 determines whether a percentage of the reduced service life in relation to a difference between the acquired remaining service life and the reduced service life exceeds a prescribed threshold. In this way, it is possible to prevent occurrence of a reduced service life which reaches a prescribed percentage with respect to a remaining service life after reduction.

(5) The service life information acquisition unit 18 acquires service life information that further includes the number of completed writes to the storage medium as a used service life, and the signal output unit 21 outputs the used service life, the reduced service life, and a remaining service life after reduction indicating a difference between the remaining service life and the reduced service life with respect to a total service life indicating a total number of possible writes of the storage medium. In this way, a signal indicating that the reduced service life exceeds a prescribed threshold can be displayed in an easily visible manner.

Second Embodiment

Figure 4:
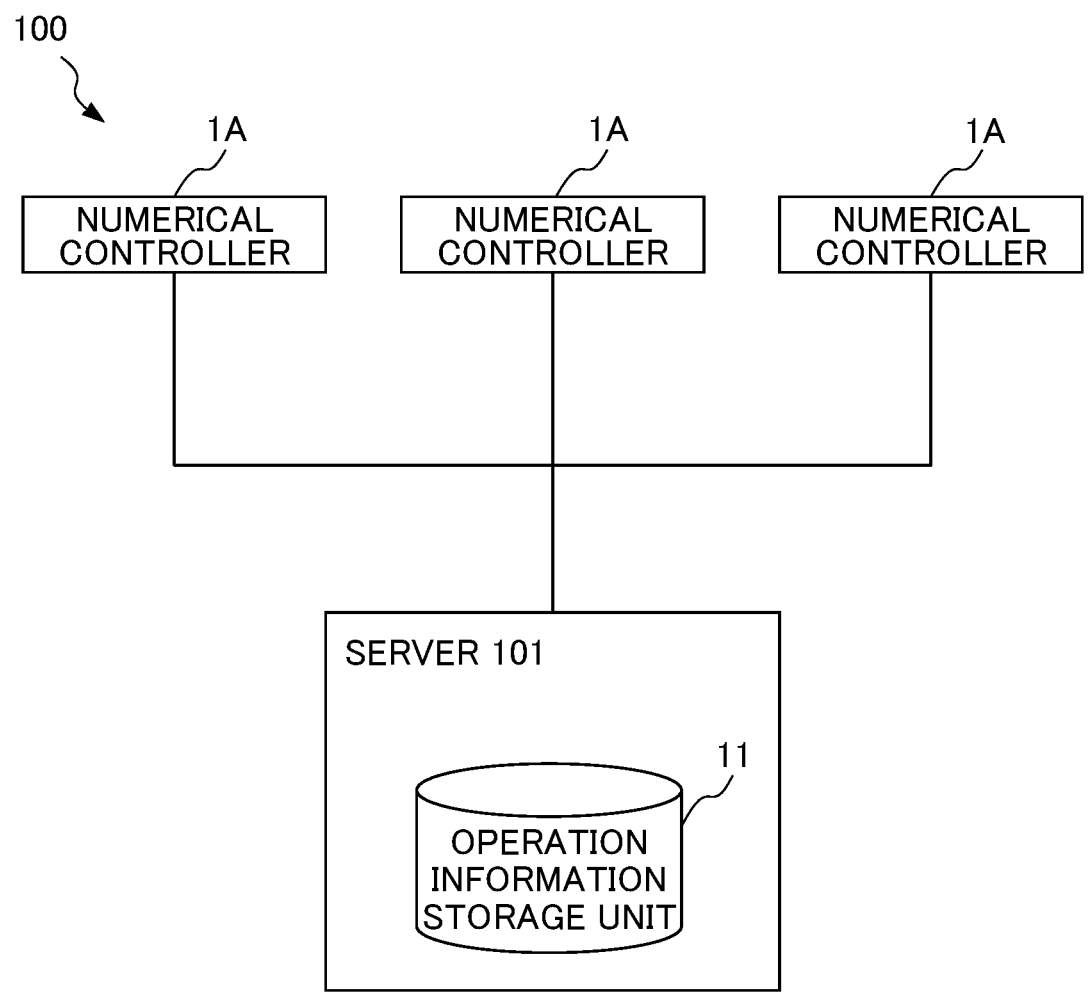
FIG. 4 is a schematic diagram illustrating an overall configuration of a numerical control system according to a second embodiment.

Next, a numerical controller 1A and a numerical control system 100 according to a second embodiment of the present disclosure will be described with reference to FIG. 4. In description of the second embodiment, the same components will be denoted by the same reference numerals, and description thereof will be omitted or simplified. As shown in FIG. 4, the numerical controller 1A and the numerical control system 100 according to the second embodiment are different from those of the first embodiment in that a plurality of numerical controllers 1A are connected to a server 101. Moreover, the numerical controller 1A and the numerical control system 100 according to the second embodiment are different from those of the first embodiment in that the operation information storage unit 11 is provided in the server 101 instead of the numerical controller 1. Even when the operation information storage unit 11 is provided in the server 101, it is possible to prevent unintended reduction in the service life of a storage medium.

While preferred embodiments of the numerical controller, the numerical control system, and the program of the present disclosure have been described, the present disclosure is not limited to the above-described embodiments but can be changed appropriately. For example, in the embodiment above, although the interval setting unit 141 sets a collection period, there is no limitation thereto. For example, when the input unit 15 does not receive input of a collection period, the interval setting unit 141 may set the collection period as constant collection. In this case, the reduced service life calculation unit 18 may set a prescribed collection period temporarily to calculate a reduced service life. The reduced service life calculation unit 18 may set a collection period of one week or one month as a temporary collection period and calculate the reduced service life using the temporary collection period.

In the embodiment above, although the signal output unit 21 includes a display device, there is no limitation thereto. The signal output unit 21 may output the signal using sound, light, touch, smell, sense, or the like, for example.

In the embodiment above, although the reduced service life calculation unit 19 determines whether the percentage of the reduced service life in relation to a difference between the acquired remaining service life and the reduced service life exceeds a prescribed threshold, there is no limitation thereto. The reduced service life calculation unit 19 may determine whether the percentage of the reduced service life in relation to the acquired remaining service life exceeds a prescribed threshold. The threshold may be changed appropriately depending on the content to be determined.

Moreover, in the embodiment above, although the numerical controller 1 includes the operation information storage unit 11, the service life information storage unit 12, and the threshold storage unit 13, there is no limitation thereto. That is, at least one of the operation information storage unit 11, the service life information storage unit 12, and the threshold storage unit 13 may be provided outside the numerical controller 1.

In the embodiment above, it has been described that one cycle involves collection of operation information and storage of the operation information in a recording medium (the operation information storage unit 11). In contrast, one cycle may involve a plurality of times of collection of operation information and an instance of storage of the collected operation information.

EXPLANATION OF REFERENCE NUMERALS 1, 1A: Numerical controller
18: Service life information acquisition unit
19: Reduced service life calculation unit
20: Determining unit
21: Signal output unit
100: Numerical control system
141: Interval setting unit

What is claimed is:

1. A numerical controller that collects data from an industrial machine and writes data into a storage medium, comprising:
   an interval setting unit that sets a time interval between cycles in which one cycle involves collection of operation information indicating an operating state of the industrial machine and writing of the collected operation information to the storage medium;
   a reduced service life calculation unit that calculates a service life of the number of writes of the storage medium reduced by the writing on the basis of the set time interval as a reduced service life;
   a service life information acquisition unit that acquires service life information indicating a remaining service life;
   a determining unit that determines whether a calculated remaining service life after reduction exceeds a prescribed threshold wherein the remaining service life after reduction is determined by the calculated reduced service life in relation to a difference between the acquired remaining service life and the calculated reduced service life exceeds the prescribed threshold by determining whether an expression is satisfied as follows (Threshold %)<((Reduced service life)/[(Remaining service life)−(Reduced service life)]=(Remaining service life after reduction))×100; and a signal output unit that outputs a signal indicating that the remaining service life after reduction exceeds the prescribed threshold when it is determined that the remaining service life after reduction exceeds the prescribed threshold.

2. The numerical controller according to claim 1, wherein the determining unit determines whether the set time interval is shorter than a time interval prescribed threshold, and
   when it is determined that the time interval is shorter than the time interval prescribed threshold, the signal output unit outputs a signal indicating that the set time interval is shorter than the prescribed threshold.

3. The numerical controller according to claim 1, wherein the service life information acquisition unit acquires service life information that further includes the number of completed writes to the storage medium as a used service life, and
   the signal output unit outputs the used service life, the reduced service life, and a remaining service life after reduction indicating a difference between the remaining service life and the reduced service life with respect to a total service life indicating a total number of possible writes of the storage medium.

4. A numerical control system comprising:
   the numerical controller according to claim 1; and
   a server having the storage medium and connected to the numerical controller.

5. A non-transitory computer readable recording medium having a program recorded thereon, the program causing a computer to function as a numerical controller that collects data from an industrial machine and writes data into a storage medium, the computer functioning as:
   an interval setting unit that sets a time interval between cycles in which one cycle involves collection of operation information indicating an operating state of the industrial machine and writing of the collected operation information to the storage medium;
   a reduced service life calculation unit that calculates a service life of the number of writes of the storage medium reduced by the writing on the basis of the set time interval as a reduced service life;
   a service life information acquisition unit that acquires service life information indicating a remaining service life;
   a determining unit that determines whether a calculated remaining service life after reduction exceeds a prescribed threshold wherein the remaining service life after reduction is determined by the calculated reduced service life in relation to a difference between the acquired remaining service life and the calculated reduced service life exceeds the prescribed threshold by determining whether an expression is satisfied as follows (Threshold %)<((Reduced service life)/[(Remaining service life)−(Reduced service life)]=(Remaining service life after reduction))×100; and a signal output unit that outputs a signal indicating that the remaining service life after reduction exceeds the prescribed threshold when it is determined that the remaining service life after reduction exceeds the prescribed threshold.

* * * * *